(12) United States Patent
Lecocq

(10) Patent No.: US 10,771,977 B2
(45) Date of Patent: Sep. 8, 2020

(54) METHOD FOR THE RAPID ACKNOWLEDGEMENT OF A FRAME

(71) Applicant: SAGEMCOM ENERGY & TELECOM SAS, Rueil Malmaison (FR)

(72) Inventor: Guillaume Lecocq, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 0 days.

(21) Appl. No.: 16/452,796

(22) Filed: Jun. 26, 2019

(65) Prior Publication Data

US 2020/0008065 A1 Jan. 2, 2020

(30) Foreign Application Priority Data

Jun. 27, 2018 (FR) ...................................... 18 55800

(51) Int. Cl.
*H04W 12/10* (2009.01)
*H04L 1/16* (2006.01)
*H04W 84/18* (2009.01)

(52) U.S. Cl.
CPC ....... *H04W 12/1006* (2019.01); *H04L 1/1664* (2013.01); *H04L 1/1685* (2013.01); *H04W 84/18* (2013.01)

(58) Field of Classification Search
None
See application file for complete search history.

(56) References Cited

U.S. PATENT DOCUMENTS

| 2011/0064223 | A1 | 3/2011 | Lu et al. |
| 2013/0272200 | A1* | 10/2013 | Takahashi ............. H04W 84/00 370/328 |
| 2017/0078290 | A1* | 3/2017 | Parvathaneni ........ H04L 9/0891 |
| 2018/0049027 | A1 | 2/2018 | Abraham et al. |

OTHER PUBLICATIONS

Yang et al; "Security Vulnerabilities in LoRaWAN;" IEEE/ACM Third International Conference on Internet-of-Things Design and Implementation; pp. 129-140; 2018.
Mar. 22, 2019 Search Report issued in French Patent Application No. 1855800.

* cited by examiner

*Primary Examiner* — Christine T Duong
(74) *Attorney, Agent, or Firm* — Oliff PLC; R. Brian Drozd

(57) ABSTRACT

The invention relates to a method, for a long range wide-area communication network comprising at least one electronic device and an application server, for the acknowledgement of a frame exchanged, the method being executed by the electronic device and comprising the steps of:
sending a first frame to the application server, the first frame comprising data,
determining a first integrity code according to the data in the first frame,
receiving a second so-called acknowledgement frame from the application server, the acknowledgement frame comprising a second integrity code,
if the first integrity code determined by the electronic device and the second integrity code are equal, then validating the acknowledgement by the application server of the first frame sent by the electronic device.

7 Claims, 3 Drawing Sheets

METHOD FOR THE RAPID ACKNOWLEDGEMENT OF A FRAME

The present invention relates to the field of wireless communication networks. The present invention relates more particularly to the field of long range wide-area networks (LoRaWan) and a method for the rapid acknowledgement of frames.

A long range wide-area communication network (hereinafter "network") is typically a network allowing communication at low transmission rate, by radio, of objects with low electrical consumption communicating for example according to a so-called LoRaWan protocol and connected to the internet by gateways, thus participating in what is called the Internet of Things. The LoRaWan protocol defines a communication protocol for the Internet of Things that uses its own modulation technique. This LoRaWan protocol sets out to be simple, inexpensive to implement and economical in energy rather than allowing high transmission rates. The advantage of a LoRaWan network is to allow long-range communications at low cost and low consumption.

A LoRaWan network thus consists of low-consumption wireless objects that communicate with application servers through gateways. The communications between the wireless objects and the gateways take place by radio waves in accordance with the LoRaWan protocol. The communication between the gateways and the application servers is typically established via an IP protocol (internet protocol), for example by means of a gathering network using Ethernet technology.

A LoRaWan network typically uses so-called ISM (standing for industrial, scientific and medical) frequency bands, typically around 868 MHz in Europe and 915 MHz in North America. The use of ISM bands in Europe requires compliance with a limited speech time on some frequency bands. This limitation takes the form of a so-called "duty cycle" constraint. This constraint defines a maximum ratio (for a frequency band, between a time during which an electronic device sends data on this frequency band and a predetermined time period. For a LoRaWan network this duty cycle is calculated over a sliding hour and is expressed as a percentage. Thus an electronic device connected to a LoRaWan network may have to comply with a duty cycle typically of one percent, which then means that this electronic device cannot send data for more than 36 seconds during the last 3600 seconds.

More generally, in a LoRaWan network it is advantageous to reduce as far as possible the durations of sending of the electronic devices connected in order to preserve the shared bandwidth resource, but also to reduce to the maximum possible extent the energy consumptions of the electronic devices.

Figure 1:
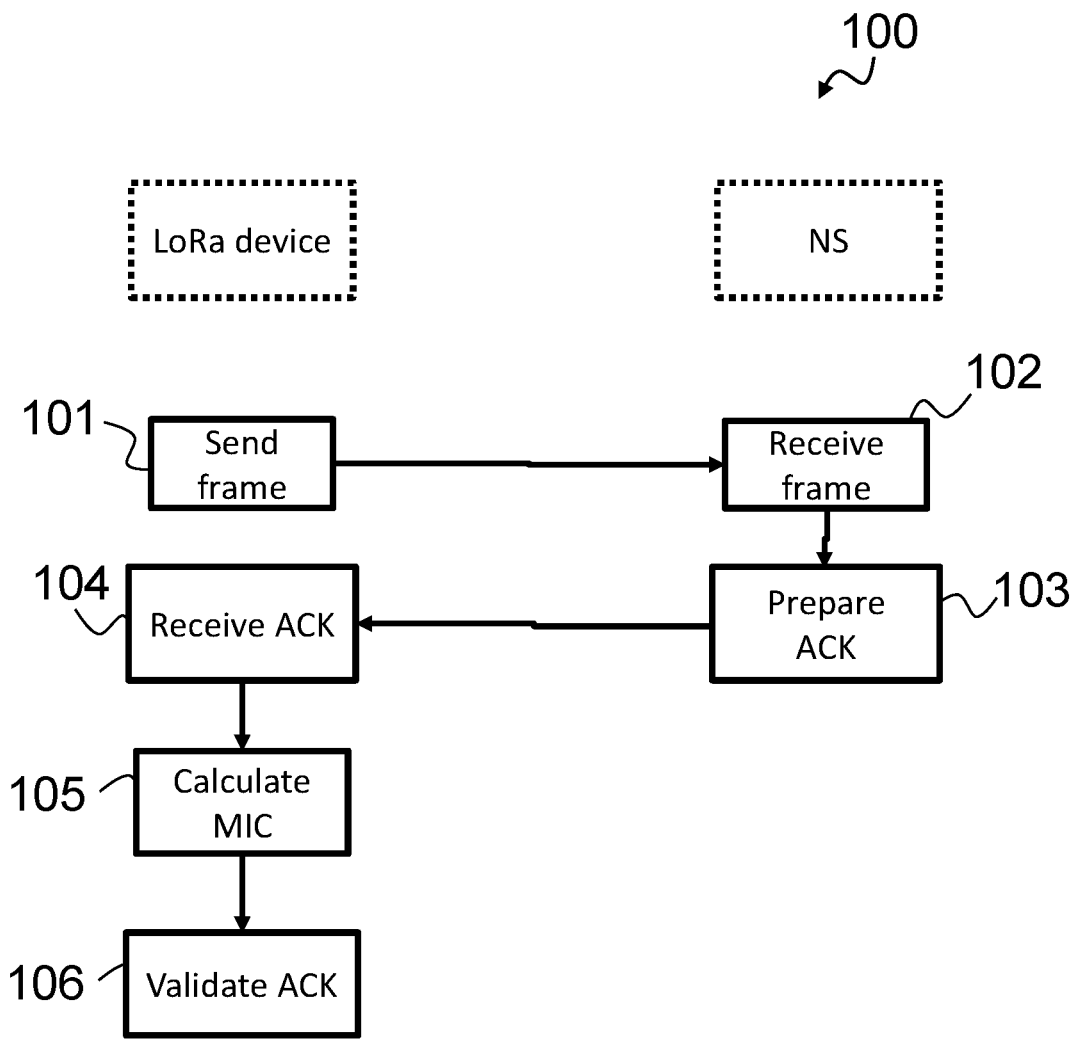

FIG. 1 is a schematic illustration of an exchange of frames between an electronic device connected to a LoRaWan network and an application server (designated NS in FIG. 1) of the LoRaWan network. The electronic device may be a connected object or any electronic device using the LoRaWan protocol. The application server may provide services of various natures to the objects connected to the LoRaWan network. The frames exchanged between the electronic device and the application server pass via a gateway in the LoRaWan network.

In a step 101, the electronic device determines a frame to be sent to the application server, and sends this frame to said application server.

The structure of the frame is for example in accordance with the LoRaWan specifications version 1.1 published in October 2017 by "LoRa Alliance, Inc.", and more particularly the specifications in Chapter 4 "MAC Message Formats". In particular, this frame comprises a payload at the physical layer level comprising:
  an MAC (standing for media access control) field header, hereinafter MHDR (standing for MAC header),
  data transported by the frame, hereinafter MACpayload,
  an integrity code of the payload of the physical layer, hereinafter MIC (standing for Message Integrity Code), as for example defined in Chapter 4.4 of the LoRaWan standard version 1.1 mentioned above.

This frame is sent via a gateway of the LoRaWan network to the application server.

In a step 102, the application server receives said frame sent by the electronic device. The LoRaWan protocol may or may not provide a mechanism for acknowledging the frames received. If no acknowledgement is necessary, the method for exchanging frames between the electronic device and the application server may end here. The exchange of data between the electronic device and the application server may also continue, the application server in return sending a frame comprising data. This latter frame is a data frame rather than an acknowledgement frame.

In the contrary case, in a step 103, the application server prepares an acknowledgement frame. The acknowledgement frame is determined according to the frame received, and comprises, in an identical manner to what was described previously, for the physical layer level, a field header "MHDR", a payload "MACpayload" and an integrity code "MIC".

This acknowledgement frame is sent by the application server to the electronic device, still via a gateway of the LoRaWan network.

In a step 104, the electronic device receives the acknowledgement frame and extracts therefrom at least the data of the three fields MHDR, MACpayload and MIC.

In a step 105, the electronic device determines, according to the data of the MHDR and MACpayload fields, an integrity code. In other words, the electronic device determines, by computation and according to the data of the fields MHDR and MACpayload, a corresponding integrity code.

In a step 106, the electronic device compares the integrity code determined during the previous step 105 with the integrity code MIC received during step 104. If the two codes are indeed equal, then the electronic device validates the correct acknowledgement of the frame by the application server. If the two codes do not correspond, then the acknowledgement is not validated. This means that data in the exchange frames have been corrupted. The electronic device can recommence the method at step 101.

This acknowledgement method makes it possible to ensure the correct reception of frames exchanged between an electronic device and an application server, but at the cost of the exchange of frames being able to represent several bytes between the electronic device and the application server.

It is therefore necessary to propose a method for overcoming these drawbacks, and in particular to reduce the quantity of data exchanged between the electronic device and the application server.

The invention relates to a method, for a long range wide-area communication network comprising at least one electronic device and an application server, for the acknowledgement of a frame sent by the electronic device and received by the application server, the method being executed by the electronic device and comprising the steps of:

sending a first frame to the application server, the first frame comprising data, determining a first integrity code according to the data in the first frame, receiving a second so-called acknowledgement frame from the application server, the acknowledgement frame comprising a second integrity code, if the first integrity code determined by the electronic device and the second integrity code are equal, then validating the acknowledgement by the application server of the first frame sent by the electronic device.

According to a supplementary embodiment of the invention, determining, according to the data in the first frame sent, a first integrity code comprising the steps of:

following the sending of the first frame, incrementing the value of a counter associated with the number of frames sent by the application server, and determining the first integrity code according to the data in the first frame and the value of the counter.

According to a supplementary embodiment of the invention, the second frame received further comprises a field comprising a counter, the step of determining the first integrity code being executed subsequently to the reception of the second frame, the first integrity code is determined according to the data in the first frame and the value of the counter received in the second frame.

The invention also relates to an electronic device suitable for being connected to a long range wide-area communication network, the electronic device being suitable for executing all or some of the steps of the method described in the present document.

The invention also relates to a method for a long range wide-area communication network comprising at least one electronic device and an application server, for acknowledging a frame sent by the electronic device and received by the application server, the method being executed by the application server and comprising the steps of:

receiving a first frame from the electronic device, the first frame comprising data, determining an integrity code according to the data in the first frame, sending, to the electronic device, a second frame comprising the integrity code, the second frame comprising no data other than the integrity code.

The invention also relates to an application server of a long range wide-area communication network, the application server being suitable for executing all or some of the steps of the method described in the present document.

The invention also relates to a system for a long range wide-area communication network, the system comprising at least one electronic device and an application server as described in the present document.

The invention also relates to a computer program, which can be stored on a medium and/or downloaded from a communication network in order to be read by a processor of an electronic device of a long range wide-area communication network. This computer program comprises instructions for implementing all or some of the steps of the method described in the present document, when said program is executed by the processor.

The invention also relates to an information storage medium or recording medium, which can be read by or is accessible to an electronic device of a long range wide-area communication network, comprising such a computer program.

Figure 2:
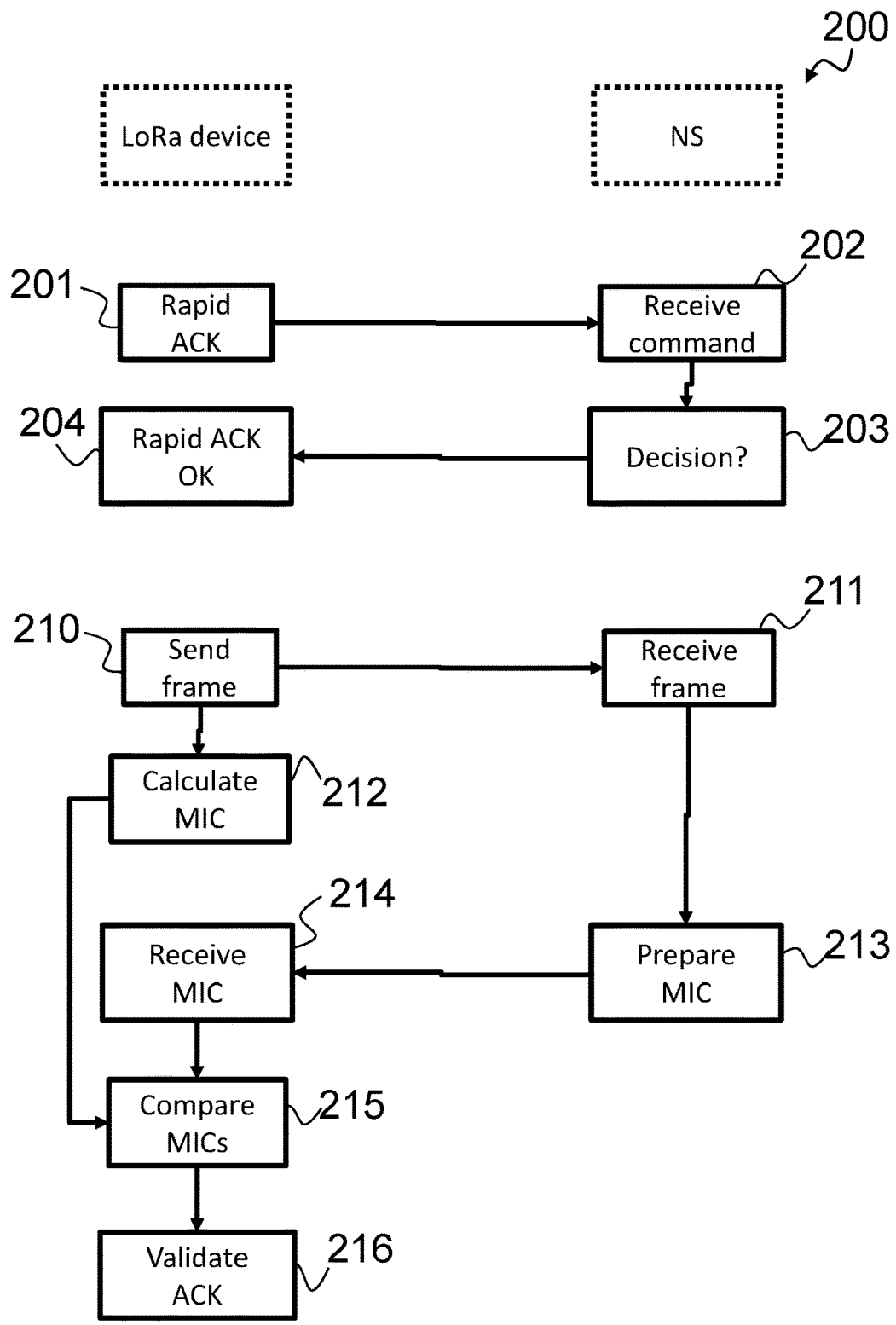
Figure 3:
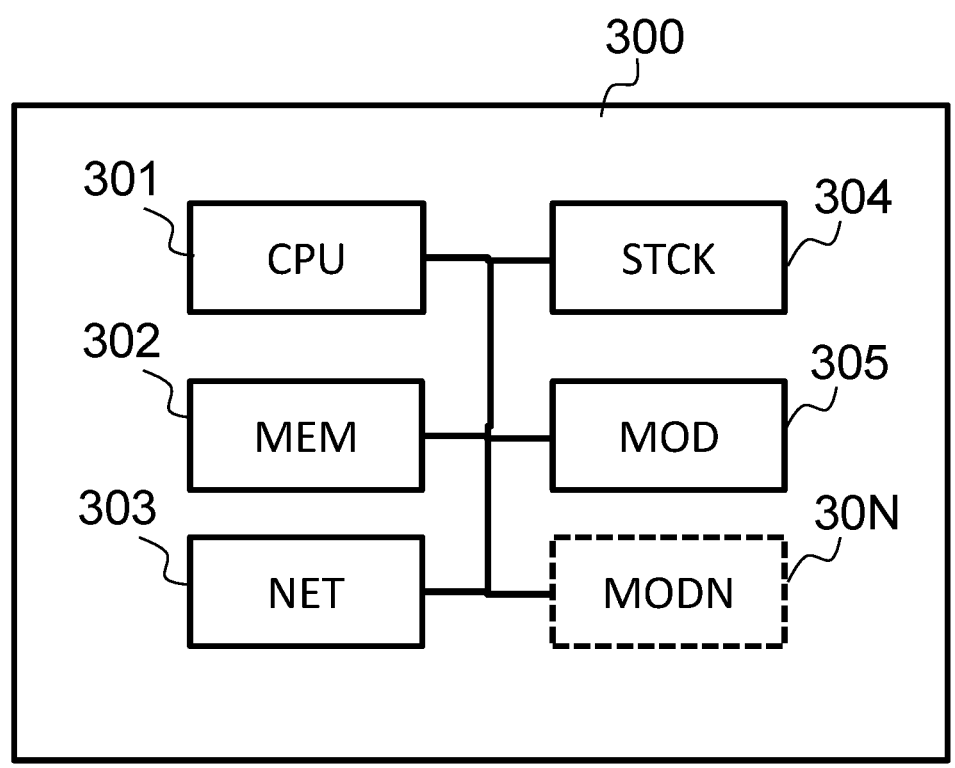

The features of the invention mentioned above, as well as others, will emerge more clearly from a reading of the following description of an example embodiment, said description being given in relation to the accompanying drawings, among which:

FIG. 1 illustrates schematically a method for exchanging frames between an electronic device connected to a long range wide-area communication network and an application server in the same network, FIG. 2 illustrates schematically a method for exchanging frames between an electronic device connected to a long range wide-area communication network and an application server in the same network according to one embodiment of the invention, FIG. 3 illustrates schematically the hardware architecture of an electronic device suitable for being connected to a long range wide-area communication network, the electronic device being suitable for executing all or some of the steps of the method illustrated in FIG. 2.

The invention makes it possible to reduce the quantity of data sent when a frame is acknowledged. The invention thus makes it possible to preserve the available bandwidth and to reduce the energy consumption of the electronic devices exchanging data by reducing the quantity of data sent or received.

FIG. 2 illustrates schematically a method for exchanging frames between an electronic device connected to a long range wide-area communication network and an application server in the same network according to one embodiment of the invention.

By default, an electronic device and an application server (designated NS in FIG. 2) according to a LoRaWan standard do not implement the method that is the subject matter of the invention when an exchanged frame is acknowledged.

For this purpose, in a first step 201, the electronic device sends, to the application server, a frame comprising a command to activate the acknowledgement method that is the subject matter of the present invention, hereinafter referred to as rapid acknowledgement.

In a step 202, the application server receives the command sent by the electronic device. The application server, in a step 203, next determines whether it is in a position to implement the rapid acknowledgement method and, if so, sends, to the electronic device, validation of the correct taking into account of the command. In a step 204, the electronic device receives the validation and can then implement the rapid acknowledgement method. In other words, if the application server supports the rapid acknowledgement method, a validation frame is sent to the electronic device. In the contrary case, the activation command can be ignored by the application server. According to the embodiment of the invention, the application server can decide to ignore the activation command, even when said application server is in a position to support the rapid acknowledgement method. The application server can also respond to an activation command by means of a frame comprising firstly information on the support or not of the rapid acknowledgement method by the application server, and secondly, if the rapid acquisition method is supported, another item of information on the acceptance or not of the activation of the rapid acknowledgement.

In a similar manner to the activation method, a corresponding method for deactivating the rapid acknowledgement can be implemented by the electronic device and the application server. The deactivation method differs through the nature of the command sent, the command corresponding to a rapid-acknowledgement deactivation request.

The electronic device may decide to implement the rapid acknowledgement method in order to preserve the available bandwidth. However, if, as described below, the electronic device finds a predetermined number of frame acknowledgement failures, the electronic device may send a command for deactivating the rapid acknowledgement method.

If the rapid acknowledgement method has been activated on the electronic device and the application server, then the first steps 210 and 211 of sending a frame are identical to the known steps 101 and 102 of the method. Step 213 of preparing and sending the response frame sent by the application server in return differs from step 103. This is because the application server prepares an acknowledgement frame. The acknowledgement frame is determined according to the frame received. The application server determines, in an identical fashion to what was described above, for the physical layer level, a field header MHDR and a payload MACpayload, and then determines, according to the previous two fields, an integrity code MIC. However, and contrary to what was illustrated in FIG. 1, the application server sends, in this step 213, to the electronic device, a second frame comprising the integrity code, the second frame not comprising any data other than the integrity code. In other words, the application server sends a frame to the electronic device comprising only the integrity code MIC. The fields MHDR and MACpayload are not included in the frame sent. The size of the frame is thus significantly reduced. This method can make it possible to reduce the size of an acknowledgement frame of 12 bytes (MHDR, MACpayload and MIC fields) to only four bytes (MIC alone).

It should be noted that the application server may respond to a frame sent by the electronic device by means of a frame comprising both an acknowledgement of the frame sent by the electronic device and data intended for the electronic device. In this case, the rapid acknowledgement method is not implemented, the application server sending a frame comprising an acknowledgement and the data to the electronic device, the integrity code being determined on all the data sent, including the acknowledgement.

In a step 212, the electronic device determines, in a similar fashion to the application server, the field header MHDR and the payload MACpayload that would correspond to the conventional acknowledgement frame that the application server should send. The electronic device can determine, from this information, an integrity code MIC expected for a conventional acknowledgement frame. The electronic device may for its part determine the content of the acknowledgement frame since this content is directly deducible from the content of the frame received during step 211 by the application server. The electronic device may also anticipate and modify some fields of the frame predetermined according to the direction of sending of the frame (uplink direction or downlink direction). The electronic device can therefore determine in parallel to the application server the acknowledgement frame expected, and deduce from this a corresponding integrity code.

In a step 214, the electronic device receives the rapid acknowledgement frame sent by the application server during step 213, this rapid acknowledgement frame comprising only the integrity code determined by the application server.

In the case where the application server, during step 213, sent a frame comprising, in addition to the acknowledgement, data intended for the electronic device, then the electronic device does not execute the following steps 215 and 216 but determines in a conventional fashion an integrity code according to the data received and compares this integrity code with the integrity code received.

The electronic device can differentiate a rapid acknowledgement frame from a conventional frame, comprising acknowledgement and data, according to the size of the frame received. A rapid acknowledgement frame typically comprises four bytes whereas a complete frame comprises more than four bytes.

In a step 215, the electronic device compares the integrity code received during step 214 and the one determined locally during step 212. If the two integrity codes are identical, then acknowledgement of the frame is validated. Otherwise the acknowledgement fails. The electronic device can then recommence the method as from step 210.

The frame sent by the application server may comprise a counter, referred to as a downlink counter. This downlink counter is incremented by the application server each time a frame is sent to the electronic device. Likewise, a so-called uplink counter can be established for the frame sent by the electronic device to the application server.

If a downlink counter is normally integrated in each frame sent by the application server to the electronic device, then the electronic device can record the value of this counter and determine locally an expected value of the downlink counter. Thus the electronic device can determine an expected value of the uplink counter and determine the expected integrity code of the rapid acknowledgement frame.

However, this mechanism may be faulted if a downlink frame is lost, the local downlink counter of the electronic device then no longer being synchronised with the downlink counter of the application server.

The rapid acknowledgement method can then be modified according to a supplementary embodiment. In this supplementary embodiment, the application server integrates the value of the downlink counter in the rapid acknowledgement frame. In this case, the electronic device must first of all receive the rapid acknowledgement frame and extract the value of the downlink counter in order to be able to execute step 212 of local determination of the integrity code, the correct value of the downlink counter being necessary for determining the integrity code.

According to one embodiment of the invention, the method for acknowledging frames between the electronic device and the application server may therefore take three forms:
  conventional acknowledgement method, as described in the LoRaWan standard,
  rapid acknowledgement method, the acknowledgment frame comprising only the integrity code,
  rapid acknowledgement method with synchronisation, the acknowledgement frame comprising the integrity code and the downlink counter.

The electronic device or the application server can determine which acknowledgement method to use (conventional, rapid acknowledgement with/without synchronisation) according to the rate of failure of the validation of the frame sent or a requirement for reduction of the bandwidth used on a frequency band.

The electronic device may decide to change from a conventional acknowledgement method to a rapid acknowledgement method with/without synchronisation, after a predetermined number of validated acknowledgements. Conversely, starting from a rapid acknowledgement method without synchronisation, the electronic device may decide to return to a rapid acknowledgment method with synchronisation, or even to a conventional acknowledgement, following a predetermined number of failures of the validation of the frame acknowledgements, possibly on a sliding window of the last frame sent. For example, determining that ten frames have not been acknowledged over the last thirty frames sent may trigger this switch to a rapid acknowledgement with synchronisation or a conventional acknowledgement. Rapid acknowledgement with synchronisation may also be requested by an electronic device receiving a succession of rapid acknowledgement frames, these frames not being considered to be valid by the electronic device. Thus, after a predetermined number of failures of the validation of rapid acknowledgement frames, an electronic device may request switching to a rapid acknowledgement method with synchronisation.

FIG. 3 illustrates schematically the hardware architecture of an electronic device 300 suitable for being connected to a long range wide-area communication network, the electronic device being suitable for executing all or some of the steps of the method 200 illustrated in FIG. 2.

Thus the electronic device 300 comprises, connected by a communication bus: a processor or CPU (central processing unit) 301; a memory MEM 302 of the RAM (random access memory) and/or ROM (read only memory) type, a radio-frequency module NET 303, for example in accordance with a LoRaWan standard, a storage module STCK 304 of the internal storage type and possibly a plurality of functional modules 405 to 40N. The storage module STCK 304 may be of the hard disk HDD (hard disk drive) or SSD (solid-state drive) type, or of the external storage medium reader type, such as an SD (secure digital) card reader. The processor CPU 301 can record data, or information, in the memory MEM 302 or in the storage module STCK 304. The processor CPU 301 can read data recorded in the memory MEM 302 or in the storage module STCK 304. These data may correspond to configuration parameters. The radio-frequency module NET 303 typically allows connection of the electronic device 300 to a long range wide-area communication network of the LoRaWan type. The functional modules 305 to 30N may be of various natures and make it possible to provide functionalities to the electronic device 300. A functional module 305 to 30N may be a surveillance camera, a receiver of a satellite geolocation system, a meteorological sensor, etc.

The processor CPU 101 is capable of executing instructions loaded into the memory MEM 302, for example from the storage module STCK 304. When the electronic device 400 is powered up, the processor CPU 301 is capable of reading instructions from the memory MEM 302 and executing them. These instructions form a computer program causing the implementation, by the processor CPU 301, or all or some of the methods and steps described above, particularly the method described in FIG. 2. Thus all or some of the methods and steps described above can be implemented in software form by the execution of a set of instructions by a programmable machine, such as a DSP (digital signal processor) or a microcontroller. All or some of the methods and steps described here can also be implemented in hardware form by a machine or a dedicated component, such as an FPGA (field-programmable gate array) or an ASIC (application-specific integrated circuit).

The invention claimed is:

1. A method, for a long range wide-area communication network comprising at least one electronic device and an application server, for the acknowledgement of a frame sent by the electronic device and received by the application server, the method being executed by the electronic device, wherein said method causes the device to perform:

sending a first frame to the application server, the first frame comprising data, receiving a second so-called acknowledgement frame from the application server, the acknowledgement frame comprising a second integrity code, the second frame received further comprising a field comprising a counter, determining a first integrity code according to the data in the first frame, the first integrity code being determined according to data of the first frame and the value of the counter received in the second frame, if the first integrity code determined by the electronic device and the second integrity code are equal, then validating the acknowledgement by the application server of the first frame sent by the electronic device.

2. The method according to claim 1, the determining, according to the data in the first frame sent, of the first integrity code causes the device to perform:

following the sending of the first frame, incrementing the value of a counter associated with the number of frames sent by the application server, and determining the first integrity code according to the data in the first frame and the value of the counter.

3. An electronic device suitable for being connected to a long range wide-area communication network, the electronic device comprises circuitry causing the device to perform:

sending a first frame to the application server, the first frame comprising data, receiving a second so-called acknowledgement frame from the application server, the acknowledgement frame comprising a second integrity code, the second frame received further comprising a field comprising a counter, determining a first integrity code according to the data in the first frame, the first integrity code being determined according to data of the first frame and the value of the counter received in the second frame, if the first integrity code determined by the electronic device and the second integrity code are equal, then validating the acknowledgement by the application server of the first frame sent by the electronic device.

4. A method for a long range wide-area communication network comprising at least one electronic device and an application server, for acknowledging a frame sent by the electronic device and received by the application server, the method being executed by the application server, wherein said method causes the device to perform:

receiving a first frame from the electronic device, the first frame comprising data, sending a second so-called acknowledgement frame coming from the application server, the acknowledgement frame comprising a second integrity code, the second frame received further comprising a field comprising a counter, determining an integrity code according to the data in the first frame, the integrity code being determined according to the data in the first frame and the value of the counter received in the second frame.

5. An application server of a long range wide-area communication network, the application server the electronic device comprises circuitry causing the device to perform:

receiving a first frame from the electronic device, the first frame comprising data, sending a second so-called acknowledgement frame coming from the application server, the acknowledgement frame comprising a second integrity code, the second frame received further comprising a field comprising a counter, determining an integrity code according to the data in the first frame, the integrity code being determined according to the data in the first frame and the value of the counter received in the second frame.

6. A System for a long range wide-area communication network, the system comprising at least one electronic device according to claim 4 and an application server of a long range wide-area communication network, the application server the electronic device comprises circuitry causing the device to perform:
    receiving a first frame from the electronic device, the first frame comprising data,
    sending a second so-called acknowledgement frame coming from the application server, the acknowledgement frame comprising a second integrity code, the second frame received further comprising a field comprising a counter,
    determining an integrity code according to the data in the first frame, the integrity code being determined according to the data in the first frame and the value of the counter received in the second frame.

7. A non-transitory computer-readable storage medium having computer program stored therein, wherein the computer program comprises instructions for the implementation, by a processor, of a method according to claim 1, when the computer program is executed by the processor.

\* \* \* \* \*